United States Patent [19]

Nicholas

[11] 4,008,688
[45] Feb. 22, 1977

[54] PET BED

[76] Inventor: Dimitri P. Nicholas, c/o The Orr Felt Company 750 S. Main St., Piqua, Ohio 45356

[22] Filed: Dec. 17, 1975

[21] Appl. No.: 641,542

[52] U.S. Cl. .................................. 119/1; 119/159
[51] Int. Cl.² ...................................... A01K 29/00
[58] Field of Search ............. 119/1, 156, 157, 159, 119/19; 43/131; 54/79

[56] References Cited

UNITED STATES PATENTS

| 3,125,663 | 3/1964 | Hoffman | 119/1 |
| 3,284,273 | 11/1966 | Prentice | 119/1 |
| 3,811,413 | 5/1974 | Scherpenborg | 119/156 |

FOREIGN PATENTS OR APPLICATIONS

| 829,247 | 1952 | Germany | 119/1 |

*Primary Examiner*—Louis G. Mancene
*Assistant Examiner*—Peter K. Skiff
*Attorney, Agent, or Firm*—Biebel, French & Nauman

[57] ABSTRACT

A pet bed having insecticidal properties is formed with a powder-impervious bottom sheet formed of box board material and an upper sheet or layer which is formed of a needled fabric or felt-like material, defining therebetween a pocket or reservoir which contains a powdered insecticide. When the pet, such as a dog or cat, lies on the upper surface, a small amount of the powdered insecticide is picked up, patted, or rubbed onto the pet's body as it comes into contact with it. This release of the insecticide controls the fleas.

5 Claims, 5 Drawing Figures

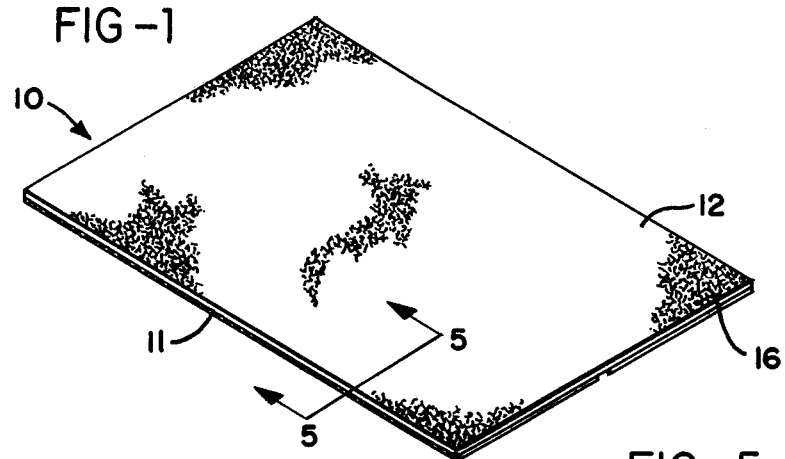
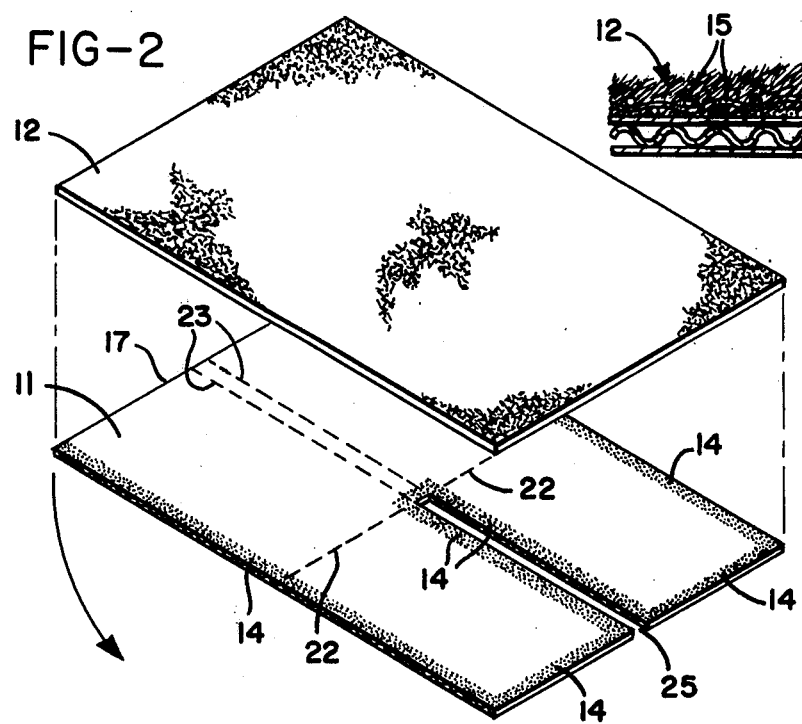
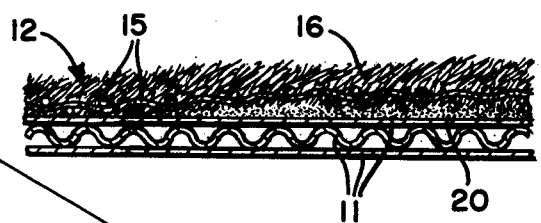
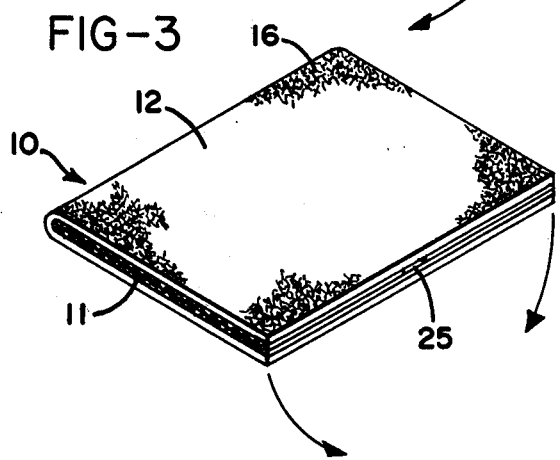
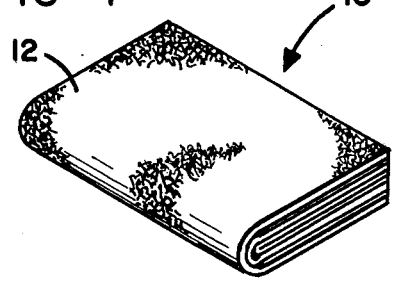

PET BED

BACKGROUND OF THE INVENTION

This invention relates to pet beds and more particularly to a sheet-like bed which contains an encapsulated powdered insecticide and which permits a release of the insecticide from the reservoir pocket, through the base fabric, through to the fibrous top or outer material, and deposits the insecticide onto the pet when the bed is used.

Many attempts have been made to rid pets, such as dogs and cats, of fleas and flea collars and flea garments have been suggested, and certain of such devices have come into general use. However, most of these devices fail to provide an insecticide which is effective at the regions which are most likely to be infested, that is, the dark, moist and/or warm regions of the pet, particularly when the pet is resting or sleeping.

A flea collar incorporating a powdered insecticide is shown in Peo, U.S. Pat. No. 2,734,483 of 1956. Collars of the type shown in Peo must be worn by the pet to be effective. A fumigation garment which also must be worn to be effective is shown in Norvig, U.S. Pat. No. 2,408,575 of 1946. A powder puff type of hand-held applicator is shown in Duffey, U.S. Pat. No. 2,762,158 of 1956, in which fabrics are joined to form a mit-like bag containing a powdered insecticide which is applied to the animal by patting the mit against the animal to release the insecticide.

In Burt, U.S. Pat. No. 1,569,710 of 1926, an absorbent or porous mat formed of chenille is saturated with an insecticide. There is no suggestion in Burt of an essentially two-piece construction with an impervious bottom layer and a porous upper layer to permit passage or release of a powdered insecticide therethrough.

Pet beds, per se, not having any means for containing or applying a powdered insecticide, are shown in Bramley, U.S. Pat. No. 3,066,646 of 1962 and Pohl, U.S. Pat. No. 3,565,040 of 1971.

SUMMARY OF THE INVENTION

The invention is directed to a generally two-piece pet bed which has an upper porous cloth-like layer joined marginally with a lower powder-impervious layer, and containing a quantity of insecticide powder therebetween, providing for the release of the powder through the upper layer. The lower layer may comprise a sheet or corrugated box board backing, while the upper layer is preferably a needled fabric. This fabric is preferably a needled batt-on-base fabric so that it presents an upper non-woven batting surface, the fibers of which are intermittently connected and locked to an inner or lower woven warp and weft. It defines with the box board backing a pocket for containing the powdered insecticide.

The needled upper layer defines a relatively soft wear and stain resistant bedding surface. When the pet lies on the bed its warm body parts are in direct contact with the bedding surface. These are the regions which the flea will normally migrate to, and thus the powder which is released through the upper layer will be most effective in controlling infestations of fleas on the pet. Also, the bed, because of its built-in insecticide supply, contains an automatic deterrent to fleas congregating and being attracted to the pet's quarters.

The parts making up the pet bed of the present invention are relatively low cost, compact, durable, neat and attractive. A bed is provided by this invention which may be used in a dog house or the like and which retains its effectiveness over a long period of time. A construction is provided by means of which the bed can be folded into a small package for ease of shipment and handling.

BRIEF DESCRIPTION OF THE DRAWINGS

FIG. 1 is an isometric view of a pet bed according to this invention;

FIG. 2 is an exploded view showing the parts of the bed of FIG. 1;

FIG. 3 shows the bed in a first folded condition;

FIG. 4 shows the bed in a fully folded condition for shipment; and

FIG. 5 is a fragmentary enlarged transverse section taken generally along the line 5—5 of FIG. 1.

DESCRIPTION OF THE PREFERRED EMBODIMENT

A pet bed 10 according to the present invention is illustrated as including a powder-impervious bottom layer 11 and an overlying top layer 12. The bottom layer 11 preferably consists of a die-cut sheet of corrugated box board material. The upper or overlying layer 12 consists of a porous cloth-like material. The upper layer 12 is formed with essentially the same dimensions as the bottom layer 11, and is joined to the layer 11 at the margins thereof by a hot melt adhesive illustrated generally at 14 in FIG. 2. Thus, the major areas of the layers are not joined to each other, but define a thin space or pocket which is substantially coextensive with the layers.

The upper layer 12 is preferably a needled fabric consisting of an inner woven portion illustrated generally at 15 in FIG. 5, and an upper surface comprising a layer of non-woven batting 16 which has been intimately joined and locked to the fabric by needling in a needling loom to provide a nap-like absorbent and relatively soft upper surface. The needling provides a completed fabric in which many of the fibers are thickness-oriented. The fabric may have a thickness of from ⅛ to ¼ inch or more, and the needling provides a controlled porosity which permits a powder-like material to pass therethrough, when the upper layer is tapped, rubbed or patted. Such a needled fabric may be constructed in a manner similar to that by which relatively heavy papermaker's felts are constructed, as shown, for example, in U.S. Pat. Nos. 950,950 and 2,943,379, and British patent No. 939,933. It has been found that materials comprising a blend of wood and synthetic of weight is satisfactory to permit a release of insecticide powder through the pores thereof to the upper mat surface 16 of the upper layer 12.

One marginal edge as illustrated by the edge 17 in FIG. 2 is initially allowed to remain open, and suitable flea powder material in inserted into the pocket or reservoir space formed between the layers 11 and 12. Such material is illustrated in exaggerated thickness at 20 in FIG. 5, although a small quantity of about ¼ to 2 ounces per square foot has been found to be effective. The powder is thus encapsulated in a thin layer between the upper and lower portions of the bedding, and then the marginal edge 16 is sealed to close the pocket and thus enclose and encapsulate the powder 20.

A wide variety of safe and effective powder-type insecticides, which may also incorporate a fungicide, may be used. One material which has been found to be effective consists of 95% inert powder filler and 5% carbaryl (1-naphthyl N-methylcarbamate).

To facilitate the folding of the completed pet bed 10 into a smaller package for shipping, the lower layer 11 may be scored for folding as indicated by the broken lines 22 and 23 in FIG. 3. Further, a dart or partial cutout 25 may be formed in the lower layer 11 as shown in FIG. 2 to facilitate the folding of the completed bed 10 into a small package for shipment. The first fold is along the axis of the line 22 to form a partially folded package as shown in FIG. 3, while a second fold is along the lines 23 to form a compact package for shipment with the outer felted layer being exposed as shown in FIG. 4.

It will therefore be seen that this invention provides a pet bed which may be placed in a dog house or a garage or the like which provides an upper absorbent surface which is soft and comfortable to the pet. The upper surface is also tough and resistant to scratching and to the natural inclination of dogs to "make a bed" when they lie down.

An impact on the upper layer 12 is sufficient to drive a small quantity of the powder material 20 through the pores of the material. Since the warm and often the moist parts of the pet are lying flat against the batting, the insecticide is thus most effective where it needs to be effective to kill the fleas which naturally migrate toward such warm and/or moist regions.

While the form of apparatus herein described constitutes a preferred embodiment of this invention, it is to be understood that the invention is not limited to this precise form of apparatus, and that changes may be made therein without departing from the scope of the invention.

What is claimed is:

1. A pet bed having insecticidal properties comprising a relatively impervious bottom sheet-like layer and an upper relatively porous fabric-like covering joined marginally with said bottom layer and being unattached to said bottom layer inwardly of the margins thereof, said covering having a non-woven batting at the upper surface thereof intimately joined to a woven fabric base providing a porosity to permit the passage of powder insecticide therethrough, and a quantity of powdered insecticide received between said covering and said bottom layer so that said powder can penetrate through said covering and come into contact with a pet lying or resting on said upper surface thereof.

2. A flat sheet-like insecticide containing pet bed comprising a bottom generally sheet-like impervious layer of corrugated box board material and an upper cloth-like layer of needled fabric and batting combination, said upper layer being marginally joined to said bottom and defining therebetween a pocket which is substantially coextensive therewith, said upper layer being porous to permit the passage of insecticide powder from said pocket to the upper surface thereof, said pocket containing an insecticide in powdered form, the porosity of said upper layer providing for the migration of powder from said pocket to the upper surface thereof when contacted by a pet.

3. The bed of claim 2 in which said upper and bottom layers are marginally sealed by a hot melt glue.

4. The pet bed of claim 2 in which said upper layer comprises a pad of wool and synthetic fibers with an upper batting surface attached to an inner woven fabric to provide a relatively soft, absorbent, and wear resistant upper surface while maintaining said porosity.

5. A flat sheet-like flea-repellent bed for dogs and cats comprising a relatively impervious bottom sheet and an overlying upper layer of relatively porous fabric bonded marginally with said bottom sheet and being unattached to said bottom sheet inwardly of the margins thereof and in closely spaced relation thereto, said upper layer having a porosity to permit the passage of flea powder therethrough, and a thin layer of flea powder received between said upper layer and said bottom sheet so that said powder can penetrate through said upper layer and come into contact wiht a dog or cat lying or resting on the upper surface thereof.

* * * * *